United States Patent [19]
Pfeiffer et al.

[11] Patent Number: 5,658,481
[45] Date of Patent: Aug. 19, 1997

[54] RESISTANCE HEATING ELEMENT OF THERMOPLASTIC MATERIALS

[75] Inventors: Bernhard Pfeiffer, Kelkheim; Anne Texier, Lille, both of Germany

[73] Assignee: Hoechst Aktiengesellschaft, Frankfurt, Germany

[21] Appl. No.: 714,803

[22] Filed: Sep. 17, 1996

Related U.S. Application Data

[63] Continuation of Ser. No. 291,621, Aug. 17, 1994, abandoned.

[30] Foreign Application Priority Data

Aug. 19, 1993 [DE] Germany .................. 43 27 874.4

[51] Int. Cl.$^6$ .................. H05B 3/34; H01B 1/02; C05K 3/40
[52] U.S. Cl. .................. 219/549; 219/553; 252/511; 252/512; 524/494
[58] Field of Search .................. 252/511–513, 518, 252/519; 219/545, 548, 552, 553; 524/494, 495, 496

[56] References Cited

U.S. PATENT DOCUMENTS

| | | | |
|---|---|---|---|
| 4,500,595 | 2/1985 | Gerteisen et al. | 428/294 |
| 4,960,642 | 10/1990 | Kosuga et al. | 428/407 |
| 5,034,157 | 7/1991 | Merrell et al. | 252/512 |
| 5,091,255 | 2/1992 | Hsu et al. | 428/378 B |
| 5,093,037 | 3/1992 | Ohi et al. | 252/512 |
| 5,098,610 | 3/1992 | Okomura et al. | 252/511 |

FOREIGN PATENT DOCUMENTS

| | | |
|---|---|---|
| 40 24 268 | 2/1992 | Germany . |
| 55-107426 | 8/1980 | Japan . |
| 63-90564 | 4/1988 | Japan . |
| 63-92672 | 4/1988 | Japan . |
| 5-7517 | 1/1993 | Japan . |

*Primary Examiner*—Philip H. Leung
*Assistant Examiner*—Sam Paik
*Attorney, Agent, or Firm*—Curtis Morris & Safford P C.

[57] ABSTRACT

A resistance heating element comprises a fiber-reinforced thermoplastic material having 1–60% by weight of glass fibers and having 1–20, preferably 5–15% by weight of steel fibers. The heating element can be prepared from thermoplastic granules which are filled with glass fibers and steel fibers and which have been obtained by melt pultrusion of continuous fiber strands and cutting to granule length.

7 Claims, No Drawings

RESISTANCE HEATING ELEMENT OF THERMOPLASTIC MATERIALS

This application is a continuation of application Ser. No. 08/291,621, filed Aug. 17, 1994, now abandoned.

DESCRIPTION

The invention relates to resistance heating elements of thermoplastic materials having good mechanical and thermal properties.

Resistance heating elements of thermoplastics filled with conductive material are known in principle. Various thermoplastics are used for this purpose. Various metals or metal alloys and carbon in different modifications having relatively high contents are employed as the conductive material. The conductive material is often employed in the form of fibers (cf. DE-C/4024268, JA-A 91/37021, JA 83/176220, JA 85/231764 and JA 88/202876).

According to JA-A 87/190605, it is also known to use a composite of cut glass fibers and carbon fibers. However, disadvantages here are the high contents of conductive material and the limited fields of use, due to the mechanical and thermal properties of the thermoplastics used, and problems which occur during compounding of the material.

The invention is based on the problem of developing resistance heating elements having a low content of conductive material coupled with good mechanical and thermal properties of the thermoplastic material.

According to the invention, the problem is solved in that the resistance heating element comprises a fiber-reinforced thermoplastic material having 1–60% by weight of glass fibers and 1–20, preferably 5–15% by weight of steel fibers. The thermoplastic granules filled with glass fibers and steel fibers comprise continuous fiber strands which have been impregnated with thermoplastics by melt pultrusion and are subsequently cut to fiber length/granule length.

The length of the glass fibers and of the steel fibers is 5–15 mm. Alternatively, the glass fiber granules comprise short glass fibers which are prepared by compounding cut glass into the melt of plastic.

The resistance heating elements according to the invention have the following advantages. The mechanical properties, such as, for example, tensile strength and heat distortion temperature, are improved significantly. As a result of improved fiber distribution, a high resistance to continuous stress is possible. Resistance heating elements produced according to the invention can be used chiefly for those purposes where particular mechanical and thermal stresses occur. These are, for example, surface heating, heating for handles, liquid heaters, seat heaters and heated parabolic antennas.

The invention is explained in more detail below by the embodiment examples.

Example 1:

A polypropylene having 10% by weight of steel fibers (length: 12.5 mm) and 20% by weight of short glass fibers was processed to test bars according to DIN 53455 by injection molding. For contacting, metal bars were pressed in.

The mechanical and thermal properties are shown in the following Table 1 in comparison with commercially available polypropylene.

TABLE 1

| Parameter | Standard | Unit | PP | According to the invention |
|---|---|---|---|---|
| Tensile strength | DIN 53455 | MPa | 30 | Above 70 |
| Heat distortion temperature | DIN 53461 | Degrees C. | | |
| A (1.8 MPa) | | | 40–50 | 72 |
| B (0.45 MPa) | | | 50–80 | 120 |

When the test bars were operated at a current strength of 1 ampere and a voltage of 6–9 volt, a surface temperature of 118 degrees Celsius (specific volume resistance 0.2 ohm cm) was reached. The heating-up rate is shown in Table 2.

TABLE 2

| Time (seconds) | Current strength (ampere) | Voltage (volt) | Temperature (degrees Celsius) |
|---|---|---|---|
| 0 | 1 | 6 | 25 |
| 240 | 1 | 8 | 74 |
| 300 | 1 | 9 | 92 |
| 360 | 1 | 9.2 | 102 |
| 780 | 1 | 9.13 | 118 |
| 1380 | 1 | 8.15 | 118 |

Example 2:

A polypropylene according to Example 1 was processed to sheets (80×80×2 mm) by injection molding. For contacting, metal bars were pressed in. The improvement in the mechanical and thermal properties occurred analogously to Table 1 in Example 1.

When the sheets were operated at a constant voltage of 4 volt and a current strength of about 3 ampere, a surface temperature of 85 degrees Celsius (specific volume resistance: 0.3–0.4 ohm cm) was reached. The heating-up rate is shown in Table 3.

TABLE 3

| Time (seconds) | Current strength (ampere) | Voltage (volt) | Temperature (degrees Celsius) |
|---|---|---|---|
| 0 | 3.5 | 4 | 28 |
| 30 | 3.3 | 4 | 39 |
| 60 | 3.2 | 4 | 44 |
| 180 | 3.1 | 4 | 48 |
| 540 | 3.0 | 4 | 52 |
| 600 | 3.0 | 4 | 54 |
| 720 | 2.9 | 4 | 65 |
| 900 | 3.0 | 4 | 70 |
| 1800 | 2.9 | 4 | 77 |
| 5400 | 3.0 | 4 | 84 |
| 10800 | 3.0 | 4 | 85 |

Example 3:

A polyamide 6,6 having 10% by weight of steel fibers (length 12.5 mm) and 20% by weight of glass fibers (length 10 mm) was processed to sheets (80×80×2 mm) by injection molding analogously to Example 2. For contacting, metal bars were pressed in.

The improvement in the mechanical and thermal properties is shown in Table 4.

| Parameter | Standard | Unit | PA 6,6 | According to the invention |
|---|---|---|---|---|
| Tensile strength | DIN 53455 | MPa | 40–60 | Above 80 |
| Heat distortion temperature | DIN 53461 | Degrees C. | | |
| A (1.8 MPa) | | | 80 | 200–220 |
| B (0.45 MPa) | | | 200 | 220–240 |

When operated at a constant voltage of 4 volt and a current strength of about 3 ampere, a surface temperature of 93 degrees C. was already achieved after about 15 minutes (specific volume resistance 0.3–0.4 ohm cm). The sheet according to the invention was tested under continuous operation for 4 hours.

We claim:

1. A resistance heating element of thermoplastic materials, wherein the resistance heating element comprises a fiber-reinforced thermoplastic material having 1–60% by weight of glass fibers and 1–20% by weight of steel fibers and wherein the fiber-reinforced thermoplastic material has a specific volume resistance of less than about 0.4 ohm·cm.

2. A resistance heating element as claimed in claim 1, wherein thermoplastic granules filled with glass fibers and steel fibers comprise continuous fiber strands which have been impregnated with thermoplastics by melt pultrusion and are subsequently cut.

3. A resistance heating element as claimed in claim 1, wherein the length of the glass fibers and of the steel fibers is 5–15 mm.

4. A resistance heating element as claimed in claim 1, wherein glass fiber granules comprise short glass fibers which are prepared by compounding cut glass into the melt of plastic.

5. A resistance heating element as claimed in claim 1, wherein the fiber-reinforced thermoplastic material has 5–15% by weight of steel fibers.

6. A resistance heating element as claimed in claim 2, wherein the continuous fiber strands are subsequently cut to fiber length.

7. A resistance heating element as claimed in claim 2, wherein the continuous fiber strands are subsequently cut to granule length.

* * * * *